United States Patent
Schultz et al.

(10) Patent No.: US 9,323,912 B2
(45) Date of Patent: Apr. 26, 2016

(54) METHOD AND SYSTEM FOR MULTI-FACTOR BIOMETRIC AUTHENTICATION

(75) Inventors: Paul T. Schultz, Colorado Springs, CO (US); Robert A. Sartini, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/407,079

(22) Filed: Feb. 28, 2012

(65) Prior Publication Data

US 2013/0227651 A1 Aug. 29, 2013

(51) Int. Cl.
*G06F 21/00* (2013.01)
*G06F 21/32* (2013.01)

(52) U.S. Cl.
CPC .................................. *G06F 21/32* (2013.01)

(58) Field of Classification Search
None
See application file for complete search history.

(56) References Cited

U.S. PATENT DOCUMENTS

| | | | | |
|---|---|---|---|---|
| 5,686,957 A * | 11/1997 | Baker | ............... | G02B 3/0087 348/14.07 |
| 6,038,315 A * | 3/2000 | Strait et al. | ..................... | 713/183 |
| 6,202,014 B1 * | 3/2001 | Brandt et al. | .................... | 701/50 |
| 6,219,639 B1 * | 4/2001 | Bakis et al. | ..................... | 704/246 |
| 6,421,453 B1 * | 7/2002 | Kanevsky et al. | ............... | 382/115 |
| 6,985,070 B1 * | 1/2006 | Parker | ..................... | 340/5.33 |
| 7,690,032 B1 * | 3/2010 | Peirce | ............... | 726/9 |
| 7,743,405 B2 * | 6/2010 | Hancock et al. | .................... | 726/2 |
| 8,458,465 B1 * | 6/2013 | Stern et al. | ..................... | 713/166 |
| 2001/0039619 A1 * | 11/2001 | Lapere et al. | ................. | 713/186 |
| 2002/0091937 A1 | 7/2002 | Ortiz | | |
| 2002/0093425 A1 * | 7/2002 | Puchek et al. | ................. | 340/540 |
| 2002/0184538 A1 | 12/2002 | Sugimura et al. | | |
| 2003/0120934 A1 | 6/2003 | Ortiz | | |
| 2003/0204526 A1 * | 10/2003 | Salehi-Had | ............... | 707/104.1 |
| 2004/0059924 A1 | 3/2004 | Soto et al. | | |
| 2005/0098621 A1 | 5/2005 | De Sylva | | |
| 2005/0149738 A1 * | 7/2005 | Targosky | ..................... | 713/182 |
| 2005/0163319 A1 * | 7/2005 | Hancock et al. | .............. | 380/270 |
| 2005/0246291 A1 | 11/2005 | Delgrosso et al. | | |
| 2006/0036855 A1 * | 2/2006 | Simonen | ..................... | 713/168 |
| 2006/0064037 A1 | 3/2006 | Shalon et al. | | |
| 2006/0070114 A1 * | 3/2006 | Wood et al. | ..................... | 726/2 |
| 2006/0078176 A1 * | 4/2006 | Abiko et al. | ................. | 382/124 |
| 2007/0016777 A1 | 1/2007 | Henderson et al. | | |
| 2007/0055517 A1 * | 3/2007 | Spector | ..................... | 704/246 |
| 2007/0150126 A1 * | 6/2007 | Crank | ..................... | 701/4 |
| 2008/0066167 A1 * | 3/2008 | Andri | ..................... | 726/5 |
| 2008/0113785 A1 * | 5/2008 | Alderucci et al. | .............. | 463/29 |
| 2008/0211627 A1 * | 9/2008 | Shinzaki | ..................... | 340/5.82 |
| 2008/0319507 A1 | 12/2008 | Myers | | |
| 2009/0023422 A1 * | 1/2009 | MacInnis et al. | ............. | 455/411 |
| 2009/0116703 A1 | 5/2009 | Schultz | | |
| 2009/0121938 A1 * | 5/2009 | Wood | ..................... | G01S 17/66 342/386 |
| 2009/0152343 A1 * | 6/2009 | Carter et al. | ................... | 235/379 |
| 2009/0292216 A1 | 11/2009 | Krch et al. | | |
| 2010/0071031 A1 * | 3/2010 | Carter et al. | ..................... | 726/2 |
| 2010/0085152 A1 | 4/2010 | Fukuda et al. | | |

(Continued)

*Primary Examiner* — Peter Poltorak

(57) ABSTRACT

An approach for enabling multi-factor biometric authentication of a user of a mobile device is described. A biometric authenticator captures, via a mobile device, first and second biometric data for a user. The biometric authentication further associates the first biometric data and the second biometric data. The biometric authenticator then initiates a multi-factor authentication procedure that utilizes the first biometric data and the second biometric data to authenticate the user based on the association.

20 Claims, 15 Drawing Sheets

(56) References Cited

U.S. PATENT DOCUMENTS

| | | | |
|---|---|---|---|
| 2010/0281254 A1* | 11/2010 | Carro et al. | 713/162 |
| 2011/0145817 A1* | 6/2011 | Grzybowski | 718/1 |
| 2011/0154460 A1* | 6/2011 | Khare et al. | 726/7 |
| 2011/0295603 A1* | 12/2011 | Meisel | 704/246 |
| 2012/0011579 A1 | 1/2012 | Niinuma | |
| 2012/0185397 A1* | 7/2012 | Levovitz | 705/71 |
| 2012/0185916 A1* | 7/2012 | Chae et al. | 726/2 |
| 2012/0200389 A1* | 8/2012 | Solomon | 340/5.52 |
| 2012/0257797 A1* | 10/2012 | Leyvand et al. | 382/118 |
| 2013/0133049 A1 | 5/2013 | Peirce | |
| 2013/0176474 A1* | 7/2013 | Kim | H04N 5/23293 348/333.11 |
| 2013/0219193 A1 | 8/2013 | Baughman et al. | |
| 2013/0225129 A1 | 8/2013 | Norbisrath et al. | |
| 2013/0227651 A1* | 8/2013 | Schultz et al. | 726/4 |
| 2014/0013422 A1* | 1/2014 | Janus et al. | 726/19 |

* cited by examiner

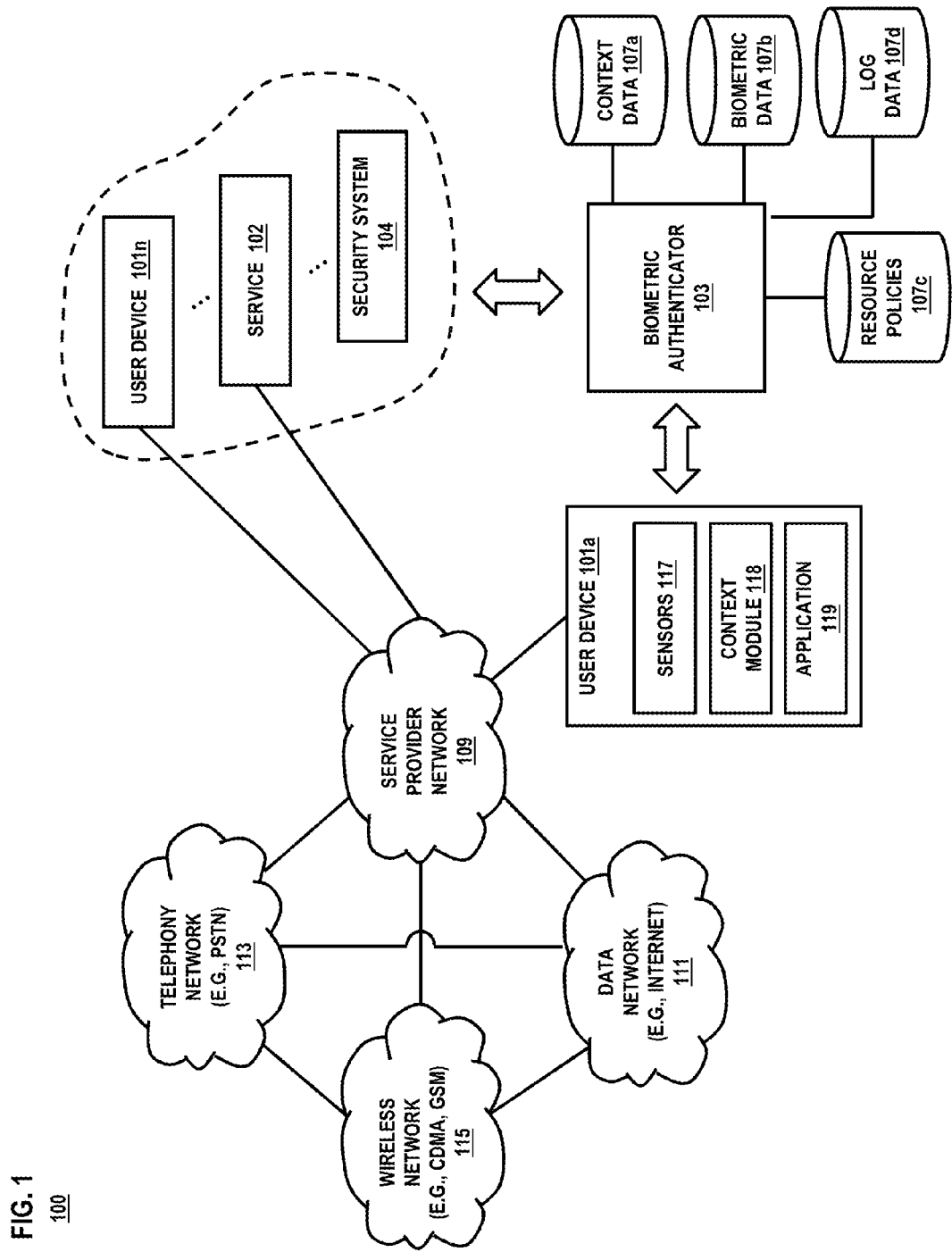

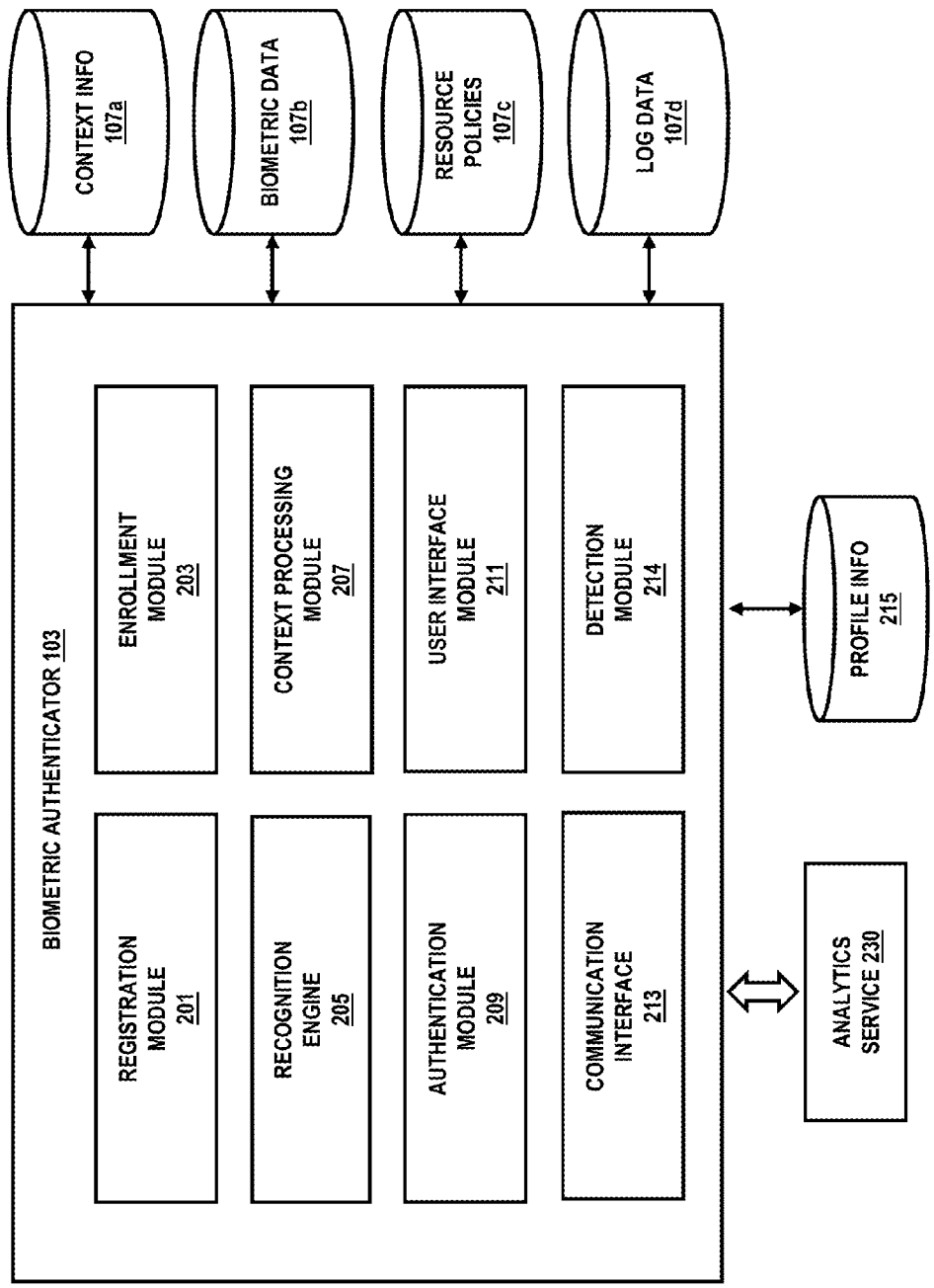

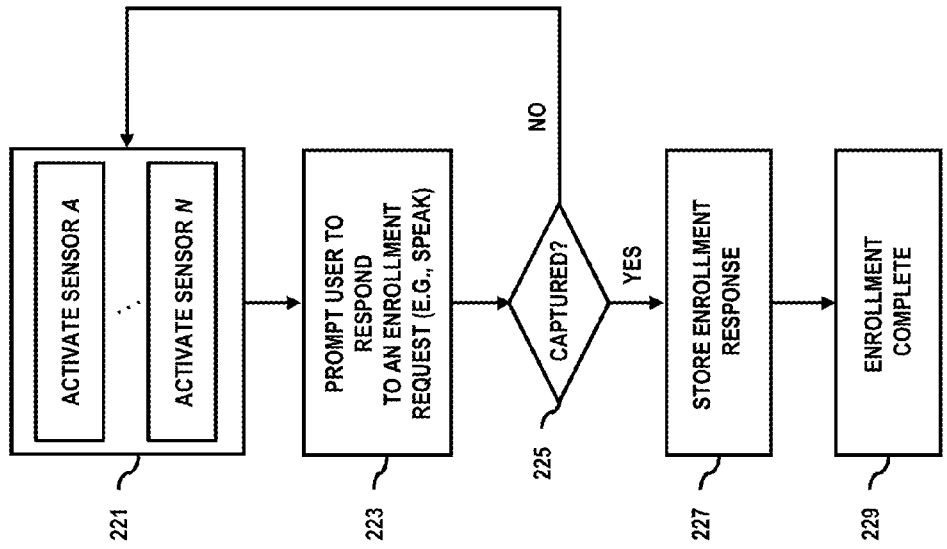

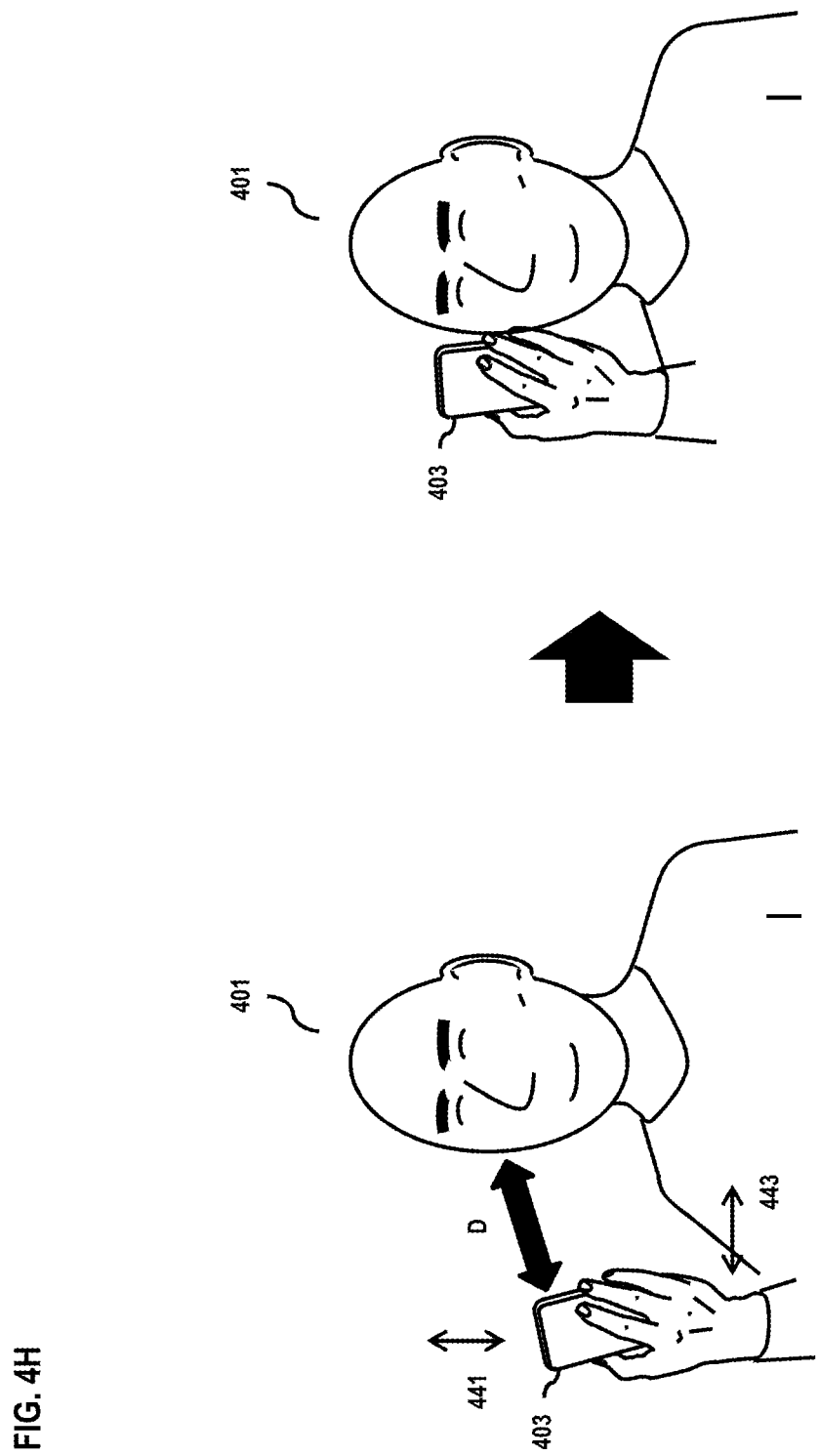

METHOD AND SYSTEM FOR MULTI-FACTOR BIOMETRIC AUTHENTICATION

BACKGROUND INFORMATION

Service providers are continually challenged to deliver value and convenience to consumers by providing compelling network services and advancing the underlying technologies. One area of interest has been the development of security services—e.g., for performing strong authentication of mobile device users based on the capture and analysis of biometric data. Unfortunately, biometric authentication may require significant computing and network resources, e.g., storage, processing, etc., and thus, are not suitable for mobile applications. This resource issue is even more problematic if more sophisticated biometric authentication schemes are to be utilized.

Based on the foregoing, there is a need for enabling effective use of biometric data to provide security for user devices.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 1 is a diagram of a system for enabling multi-factor biometric authentication of a user of a mobile device, according to one embodiment;

FIG. 2A is a diagram of the components of a biometric authenticator, according to one embodiment;

FIG. 2B is a diagram of flowchart depicting an enrollment process carried out by the biometric authenticator of FIG. 1, according to one embodiment;

FIGS. 4F-4I are diagrams of a user of a mobile device accessing a resource based on multi-factor biometric authentication, according to various embodiments;

DESCRIPTION OF THE PREFERRED EMBODIMENT

Figure 3B:
FIGS. 3A and 3B are flowcharts of processes for enabling multi-factor biometric authentication of a user of a mobile device, according to various embodiments.

An apparatus, method and software for enabling multi-factor biometric authentication of a user of a mobile device are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form to avoid unnecessarily obscuring the present invention.

FIG. 1 is a diagram of a system for enabling multi-factor biometric authentication of a user of a mobile device, according to one embodiment. In certain embodiments, the system 100 facilitates the gathering, exchange and processing of multiple different types of biometric data pertaining to the user for enabling resource allocation, access, use and/or entry.

Resources subject to or associated with the authentication procedure may involve a user device 101a-101n (e.g., a server, workstation, mobile device, data store). Other resources may include an application or service 102 (e.g., web service), a security system of a facility 104 (e.g., building, automated teller machine (ATM)), or the like. The procedure provides multi-factor biometric authentication, wherein multiple different biometric data types are relied upon for fulfilling an authentication scheme.

For the purpose of explanation, biometric authentication pertains to various methods for granting access, use, allocation and/or entry to a resource based on the authentication of intrinsic physical or behavioral traits of a requesting person (user). Biometric identifiers/traits include the distinctive, measurable physiological and/or behavioral characteristics of the user that enable the repeat distinguishing of one user from another. Physiological characteristics are related to the user's body and may include fingerprint data, facial data, voice physiology, hand geometry, retinal geometry or odor/scent information. Behavioral characteristics are related to the behavior of the user, including but not limited to, typing rhythm, gait and voice data (e.g., a voice print, inflection patterns, speech patterns).

Traditionally, various applications employ the use of voice recognition or face recognition technology as a means of distinguishing the unique characteristics of different users. However, conventional systems do not adequately perform biometric authentication based on the concurrent capture and processing of multiple different characteristics of a user.

To address this issue, a biometric authenticator 103 is configured to operate in connection with, e.g., the user device 101a (e.g., a mobile device) and/or various resources to permit the gathering and processing of multiple different types of biometric data. This can include, for example, the gathering of voice data (representing the user's utterance or voice characteristics) concurrent with the gathering of video data of the user's facial characteristics. Also, other forms of biometric data, including iris data, retinal data, vein data, and fingerprint data, may also be gathered and processed. Hence, the biometric authenticator 103 enables multiple different biometric factors to be captured and analyzed for correlating a user's facial expressions coupled with the user's speech/vocal expressions.

In certain embodiments, the data is gathered in connection with an enrollment procedure or authentication procedure of the biometric authenticator 103. For these procedures, the biometric authenticator 103 employs various sensors of a user device 101a to facilitate the gathering of voice and facial characteristics of the user. In certain embodiments, the authentication procedure is employed in connection with a resource allocation, access, usage, or entry scheme, while enrollment is performed to facilitate user biometric/intelligence gathering.

The enrollment procedure, in some embodiments, enables a user to provide baseline biometric data related to the user (e.g., a biometric profile). Biometric data, as generated, may include a combination of specific data points for uniquely identifying a user's physical, physiological, and/or behavioral characteristics. For the purpose of illustration, the biometric data may be equivalent to any captured voice, face, fingerprint, iris, retinal, vein, and other data collected in relation to a particular user. Alternatively, the biometric data include only a subset of the collected data, the subset representing data for indicating only specific points of distinction for a given subject (e.g., a user).

The enrollment procedure may include, for example, one or more instructions to be carried out by the user involving the capturing of physical, physiological, and behavioral characteristics. In certain embodiments, the user performs enrollment during an initial registration process with the biometric authenticator 103 or at a later time. In other instances, enrollment may be performed on demand, such as to accommodate different resource access or authentication schemes. For example, the user may be required to perform on demand or successive enrollment scenarios in order to gain higher levels of access to a particular resource. It is noted, therefore, depending on the authentication scheme, that the enrollment process can be prompted by the resource to be accessed or activated by the user directly (e.g., via a user interface for interacting with the biometric authenticator 103). Alternatively, the biometric authenticator 103 may prompt the user to execute enrollment upon determining no existing or up-to-date biometric data 107b is available, or a greater level of authentication/authorization is required for the user.

Any device having the required external and/or internal sensors 117—e.g., camera and voice recorder—can be employed by the biometric authenticator 103 to conduct enrollment. Under this scenario, enrollment is performed via the user device 101a or a different user device, such as the user's desktop computer, network camera, or a workstation featuring camera/video capture and audio capture capabilities. By virtue of gathering multiple types of data related to the user, enrollment is performed in a manner similar to a video chat session wherein the user looks into the camera while speaking into the microphone. The enrollment procedure may correspond to a set of default instructions and protocols, or be defined according to instructions and protocols established by the facilitator and/or provider of the various resources to be allocated, accessed, used and/or entered. Such instructions and protocols are defined by way of one or more resource policies 107c.

In certain embodiments, the biometric authenticator 103 prompts the user to verbally and physically respond to various questions, commands and/or tasks during enrollment. For example, a message may be presented to a user interface to prompt the user to utter a word, a phrase, a series of digits from 0-9 (or specifically the entire range of digits from 0-9), a specific term, etc. As another example, the user may be prompted to alter the angle of image capture or device orientation as they recite a specific phrase or to adapt the position of the camera as the user speaks (e.g., capture specific aspects of their face, capture a profile view). The user may also be prompted to perform various conditional enrollment scenarios. For example, the user may be required to recite a phrase while looking into a camera sensor under a low lighting environmental condition. Under this scenario, a lighting source can be provided by the capture device, the mobile device, etc. It is contemplated that the mobile device may be operated in a flashlight mode, wherein the device display is caused to emit a high intensity white light for illuminating the face of the user as the user faces the screen/camera. During this mode, the specific commands and/or questions pursuant to the enrollment procedure may still be rendered to the screen as black colored characters/lettering or another contrasting color. Resultantly, biometric data is compiled for supporting authentication of a user when they are in a low or no lighting environment—i.e., accessing a security gate in the evening. Additionally, other types of light may be used in connection with the user biometric processes. For example, an infrared light source may be provided by the capture device for enabling the capture of retina biometric.

In other conditional enrollment scenarios, the user may be prompted to capture a video of the user's eye(s) from close range, or may be required to position the eye(s) for performance of an iris or retinal scan. This may be performed in conjunction with a capture of voice data recited by the user. Additionally, a user may enroll a specific "pose", e.g., "Big Smile!" or "SERIOUS". As yet another conditional enrollment scenario, the user may be required to adjust or modify various facial adornments or characteristics for enabling compilation of different biometric profile data. For example, a capturing of the face during enrollment with and without eyeglasses, with and without facial hair, etc.

The user recognition process, and subsequently the biometric data set 107b associated with the user, is facilitated in part by capturing the user response to specific phrases during facial characteristic data capture. Hence, by capturing various facial gestures, mannerisms and expressions in association with data for indicating user voice inflection, intonation, sound, rhythmic patterns, etc., the data recognition accuracy of the biometric authenticator 103 is enhanced. Also, the biometric data 107b set for a particular user is more comprehensive and fine tuned by virtue of conditional enrollment. Additionally, user biometric data can be refined as more data is capture with additional system usage by the user.

It is noted that the above described approach is in contrast to performing user recognition based on a static image of the user's face. The static image approach results in a narrow or limited biometric data 107b set, which does not fully account for the different characteristics, mannerisms or conditional factors that enhance biometric authentication. The biometric data captured by way of the multi-factor enrollment process described above is then stored in connection with profile information (not shown) for the user. By way of this approach, the biometric data for the user establishes a unique biometric signature, profile, fingerprint, etc. for enabling subsequent reference and/or identification of the user. It is noted therefore that the biometric data 107b related to the user includes face and voice biometric baseline data as well as corresponding movement data related to the user. Further details of the enrollment procedure are described with respect to FIG. 2B and FIGS. 4A-4E.

In one embodiment, an authentication procedure is also performed by the biometric authenticator 103—i.e., based on the biometric data 107b captured during enrollment. The authentication procedure may be defined according to instructions and protocols established by the facilitator and/or provider of the various resources to be allocated, accessed, used or entered. As mentioned previously, such protocols are set forth via one or more resource policies 107c. It is noted, therefore, that the authentication procedure can be performed in connection with a security scheme, resource access or allocation scheme, provisioning scheme, or any other scheme as an intermediate or integral authentication process related to a particular resource. The scheme may be customized accordingly for enabling a user to perform biometric authentication with respect to different types, locations and requirements of resources.

For the purpose of illustration, the biometric authenticator 103 may be employed in connection with a secured access scheme for an application or service 102 made available by a provider. In this scenario, the resource can be limited to being accessed only by those users whose voice and/or face (or other biometric) information may be authenticated as a result of performing a biometric analysis. Per the resource polices 107c established by the provider of the resource, the user may be prompted to respond to one or a series of authentication questions, challenges, commands or tasks by way of their user device 101*a*. The response provided by the user is captured, via one or more sensors 117 of the device 101*a*, for compiling a set of voice, video or other data (e.g., still image data by way of an infrared light source), referred to herein as a response input.

In certain embodiments, the biometric authenticator 103 may generate a message at the user interface of the device 101*a* for requesting the user to provide biometric data response input per an authentication process. The message may be a request for the user to utter a security code or password, perform a specific facial gesture, repeat a phrase or random string of digits, vary the angle of image capture or orientation of the device, perform a series of movements about the user's face, or a combination thereof. Alternatively, the user may be presented with a knowledge-based authentication "challenge" (e.g., recite their employee user identifier). In one embodiment, the biometric data provided as response input is gathered by the sensors 117 of the user's device 101*a* and provided to the biometric authenticator 103 for analysis. Under this scenario, the biometric authentication procedure can be facilitated via any device 101*a* available to the user for interacting with or accessing a given resource. Authentication is not limited to being performed at a dedicated location or by a dedicated device; any mobile device or location may suffice for enabling the authentication process to commence as long as the resource policies 107*a* for the resource in question are honored.

Once the response input biometric data is gathered—e.g., voice and facial expression data, the biometric authenticator 103 analyzes such data using various data recognition techniques. For example, the biometric authenticator 103 employs image, facial and voice recognition for correlating the biometric data provided by the user with the biometric data gathered during enrollment. Hence, the correlation is based on a comparing and/or recognizing of a first and second set of biometric data. When a match is found to within a predetermined threshold, the corresponding user profile associated with the biometric data 107*b* is also determined accordingly.

Once the match is determined, the authentication procedure is flagged as complete. Alternatively, the biometric authenticator 103 can return a biometric authentication confidence score (e.g., 90% confidence) to an application and allow the application to make the biometric authentication pass or fail judgment. Hence, access to, allocation of, use of, or entry into the resource is therefore granted accordingly based on the determined rights of the user, a level/score of confidence, etc. Alternatively, a subsequent procedure of the comprehensive resource access and/or authentication scheme is carried out. When no match is determined, however, the authentication procedure is flagged as incomplete. Consequently access to, allocation of, use of, or entry to the resource associated with the multi-factor biometric authentication procedure is restricted as well as the execution of any subsequent procedures.

In certain embodiments, the biometric authenticator 103 may maintains log data 107*d* for logging details regarding one or more successful and failed biometric authentication sessions or attempts. These details may include, for example, a date of session establishment or attempt thereof, a number of successful or unsuccessful attempts, time duration of access to a resource or session length, etc. The log data 107*d* may be retrieved for enabling non-repudiation and accountability of biometric authentication transactions. It is important that we only use the term "recording" as intended, for example, the recording of biometric and communication data stored in Log Data 107*d* and available to support later data analysis including statistics and information accountability auditing.

It is contemplated in certain embodiments that various recognition schemes may be used in combination for interpreting the multiple different types of biometric data provided as response input against the biometric data gathered during enrollment. It is further contemplated that the recognition may be performed in connection with specific pattern and motion recognition techniques for enabling the biometric authenticator 103 to recognize various bodily gestures and motions unique to the user. The authentication may therefore be predicated upon analysis of voice and facial characteristics of the user in conjunction with a predetermined motion or gesture (e.g., a secret facial expression or a specific sequence of facial features).

For the purposes of illustration, the analysis (e.g., recognition and matching) performed by the biometric authenticator 103 may be based on the biometric data collected during the authentication procedure or portions thereof. By way of example, when the biometric data provided as response input during authentication is recorded, specific portions of the collected data may be compared to the biometric data 107*b* captured during enrollment. Alternatively, the entire captured response may be subject to comparison. Any approach or processing technique is within the scope of the exemplary embodiments presented herein. Furthermore, it is noted that the biometric authenticator 103 may support parallel and/or distributed processing of collected data for rendering an authentication result. For example, a basic processing (e.g., general determination that the data corresponds to a face versus another part of the body) of the collected data may be analyzed via the biometric authenticator 103 at the device, while more complex analysis is performed by a network accessible service/module of the biometric authenticator 103.

Further, the user device 101 may perform initial coarse grain biometric authentication confidence score generation. Under this scenario, the biometric data is forked via a network to one or more processing resources, e.g., service provider 109, where fine grained biometric authentication confidence scores are generated. By way of example, a HTML5 browser session on the user device 101 uses the camera and microphone to gather biometric data then forks this data for concurrent local and external processing. Local processing on user device 101 generates coarse biometric authentication scores, e.g., based on coarse face (e.g., limited number of points measured a limited number of times), iris and voice data. Concurrently, the forked video and audio data is used, along with additional context information, to progressively generate fine grain biometric authentication scores based on fine face (e.g., several points measured several times), vein and voice data, using large scale computing resources, e.g., in service provider network 109. An application 119 then uses the coarse and fine grained biometric authentication confidence scores to progressively calculate combined confidence for evaluating user authorization decisions. It is noted that the biometric authenticator 103 may be configured to accommodate different processing arrangements accordingly.

In certain embodiments, the authentication result may be dependent on the processing of context information 107*a* conveyed to the biometric authenticator 103 at the moment of response input data capture. The context information may include, for example, location information, temporal information, network information, position information and other data collected by a context module 118 of a device 101*a*. The context module 118 conveys this information to the biometric authenticator 103, which stores the data 107*a* accordingly. Under this scenario, authentication may include validating of a location condition, time condition, or other factor in addition to the biometric analysis. Conditional requirements may be specified per the resource policies 107a defined for the resource in question. It is noted that processing of the context information in near real-time concurrent with biometric analysis facilitates more advanced authentication procedures to be executed in connection with a resource or other activity requiring authentication and/or authorization.

By way of example, a time condition may be required to be fulfilled to permit the opening of an automated security gate featured at the entrance of a data storage facility. In this case, the biometric authenticator 103 accesses various resource policies 107c for supporting interaction between the user, the user device 101a and the security gate. The user device 101a may include, for example, a dedicated application 119 for enabling communication exchange between the user device 101a and the security gate. Alternatively, the application 119 may be a browser application 119 or other portal through which the various authentication questions, tasks and/or commands required for access of the resource may be presented.

A first user may have twenty-four hour access to the data storage facility by virtue of access rights afforded them by the resource provider. The authentication of the user's biometric data, which includes voice and facial expressions, thus permits the gate to open at any time of the day. In contrast, a second user may only be granted access to the facility during normal business hours. As a result, successful processing of the biometric data during authentication is not sufficient in and of itself to permit entry to the facility when the current time is beyond business hours. It is noted that additional conditions for successful authentication may be further established, including conditions for specifying which rooms, equipment, or other resources may be accessed by the user once they are within the facility. Additionally, access to other systems such as automated teller machines (ATMs) can be similarly authenticated and/or authorized.

As another example, a just-in-time (JIT) authentication procedure may be carried out based on the fulfillment of one or more conditions being met per the resource policies 107a. JIT authentication may include, for example, triggering of the authentication procedure only when a specified contextual condition is determined. For instance, when it is determined a user is attempting to access a device 101n (or device 101a) for performing a low-priority transaction, the biometric authenticator 103 may enable the user to bypass some steps of the authentication procedure. In contrast, when it is determined the user is attempting to perform a high-priority transaction (e.g., a financial transaction), the biometric authenticator 103 may prompt the user to proceed with the authentication instructions, commands and/or questions. In this example, the determined priority level of the transaction, the type of activity being performed and/or the type of resource triggers the authentication procedure in time for enabling access, use, allocation or entry of the resource accordingly. It is noted that the context information 107a as gathered via the context module 118 may also include activity and/or transaction information related to the user, the user device 101a, or a combination thereof. Context data 107a can be stored on the user device 101a, in a service provider network 109, or a combination of both.

In yet another example, the biometric authenticator 103 may be configured to perform continual authentication of a user in connection with a resource. Continual authentication may include, for example, triggering of subsequent authentication procedures beyond initial authentication of the user. By way of example, a user granted access to a proprietary server after successful completion of an initial authentication may be required to perform the authentication procedure every x minutes thereafter. Under this scenario, access to the resource is revoked or interrupted unless the subsequent authentication procedure is carried out. Still further, the subsequent authentication procedure may be the same as the initial authentication procedure, thus requiring the user to provide the same biometric data as a response input in. Alternatively, the user may be required to execute different questions, tasks and/or commands for recording of biometric data. Thus, for the latter, the user is prompted to provide a different security passcode or identifier for attaining successively higher levels of authentication with respect to a resource. User biometric data processing can also be performed passively. For example, voice and facial biometric data may be captured as the user speaks during a video chat on their mobile phone. It is noted that the subsequent authentication procedures may also correspond to one or more additional enrollment procedures.

In certain embodiments, the rights of the user regarding various resources may be specified in association with their user profile information. A manager or provider of the resource may establish the access rights. These rights may be further maintained and executed in accordance with the biometric authenticator 103 per the one or more resource policies 107c. Hence, it is noted that the resource policies 107c may define the access rights and privileges of various users and/or user device 101a for accessing a resource, the one or more authentication protocols and procedures to be carried out (e.g., the required set of authentication questions to be answered and/or responded to by the user), contextual conditions to be fulfilled, etc. In addition, the resource policies 107a may define the order of execution of one or more authentication procedures to be performed with respect to a given resource.

Similar to the enrollment process, the authentication procedure may be performed in a manner similar to a voice chat session. Under this scenario, the user looks into the camera and speaks into the microphone of their user device 101a simultaneously for supporting the capture of user response input (e.g., voice and facial data) to be used in connection with an authentication request.

Also, the authentication procedure may be invoked on demand, such as when the user travels from the location of one resource to another. By way of example, device interaction for triggering authentication may be facilitated via wireless link detection (e.g., Bluetooth, near field communication (NFC), Zigbee, Z-Wave) or a network connection between the resource to be accessed and the user device 101a. An application 119 at the user device 101a may facilitate the communication process, such as in response to a user request. Alternatively, the process may be triggered in response to a proximity/presence condition being fulfilled. It is noted that identifying information, such as a device identifier, may be exchanged during communication between the resource and the user device 101a for enabling the authentication procedure to commence.

In certain embodiments, the biometric authenticator 103 may be offered by a service provider as a managed or hosted solution (e.g., as a cloud based service), as an integrated component of the user device 101a, or a combination thereof. By way of example, the user device 101a may interact with the biometric authenticator 103 via a network 109. Under this scenario, the various data processing, recognition and biometric analysis functions described herein are performed independent of the device 101a. Resultantly, any sensor data and context information gathered by the device via sensors 117 or context module 118 is transmitted to the biometric authenticator 103. Results from processing of the data it then returned/pushed to back the user device 101a.

In the case of direct integration of the biometric authenticator 103, the various data processing, recognition and biometric analysis functions described herein are performed at the device 101a. For example, the biometric authenticator 103 may be implemented in a chip set, with specific input/output sequences for use in connection with the operating system of the device, the application 119, or a combination thereof. Under this scenario, the biometric authenticator 103 directly controls the operation of the sensors 117 and context module 118 for receiving voice, face and context related data. In certain embodiments, the biometric authenticator 103 may also distribute the processing, such that certain tasks are performed at the device while others are performed via a hosted solution.

It is noted that user devices 101a-101n may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. It is also contemplated that the user devices 101a-101n can support any type of interface for supporting the presentment or exchange of data. In addition, user devices 101a-101n may facilitate various input means for receiving and generating information, including touch screen capability, keyboard and keypad data entry, video, gesture recognition, voice-based input mechanisms and the like. Any known and future implementations of user devices 101 are applicable.

It is also noted, with respect to FIG. 1, that user device 101n can be a server, workstation, desktop computer, security system, ATM, wireless node, network adapter, or any other standalone or integrated system comprising a collection of resources. In this scenario, a resource in the form of a user device 101n is different in arrangement and/or configuration than user device 101a, and therefore may not include the various components 117 and 118 as employed via user device 101a. The user device 101n may also not feature an application 119.

In certain embodiments, user device 101a, the biometric authenticator 103, resources and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

Networks 109-115 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, the communication networks 109-115 may support, embody or include portions of a signaling system 7 (SS7) network, Internet protocol multimedia subsystem (IMS), or other suitable infrastructure to support control and signaling functions.

It is noted, though not shown in the figure, that in certain embodiments user devices 101a-101n may be configured to establish peer-to-peer communication sessions with each other using a variety of technologies—near field communication (NFC), Bluetooth, ZigBee, Z-Wave, infrared, etc. Also, connectivity can be provided via a wireless local area network (LAN). By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router. Network address translation (NAT) can also be used to protect the details and configuration of the underlying network topology from becoming known.

FIG. 2A is a diagram of a biometric authenticator according to one embodiment. The biometric authenticator 103 includes various executable modules for performing one or more computing, data processing and network based instructions that in combination provide a means of enabling multi-factor biometric authentication of a user of a mobile device. Such modules can be implemented in hardware, firmware, software, or a combination thereof. By way of example, the biometric authenticator 103 may include a registration module 201, an enrollment module 203, a recognition engine 205, context processing module 207, authentication module 209, user interface module 211, communication interface 213 and detection module 214.

In addition, the biometric authenticator 103 also maintains various databases for storing context information 107a pertaining to users, biometric data 107b as generated for users, resource policies 107c, log data 107d and profile information 215 pertaining to users (or optionally resource providers). It is noted that modules 201-214 access several of these databases for performing their respective functions.

In one embodiment, a registration module 201 registers users and user devices 101a (e.g., a mobile device) for interaction with the biometric authenticator 103. By way of example, the registration module 201 receives a request to subscribe to the biometric authenticator 103 for enabling multi-factor biometric authentication of a subscribing user. The subscription process may include the generating of enrollment data for use in creating biometric data 107b; performed in conjunction with the enrollment module 203. The registration may be performed by way of a user interface generated by the user interface module 211. In addition, the registration process may include the selection of various resources the user wants access to. The resources are themselves registered with the biometric authenticator 103 and specified by one or more resource policies 107c. As noted, the resource policies 107c also indicate various access rights for a particular user with respect to the resources. Preferences and settings information may be referenced to a specific user, user device, or combination thereof and maintained in connection with profile information 215.

The registration process performed by the module 201 may also include receiving and validating a login name and/or user identification value as provided or established for a particular user during a subscription/registration process with provider of the biometric authenticator 103. The login process may also be performed in response to an access attempt or exchange between a user device 101 and a desired resource. In certain embodiments, the access attempt is facilitated by the detection module 214, and is triggered in response to a proximity condition being met between the user device 101 and the resource (e.g., via a wireless link). The login name and/or user identifier value may be received as input provided by the user from the user device 101 or other device via a graphical user interface to the biometric authenticator 103 (e.g., as enabled by the user interface module 211). Profile information 215 for respective subscribers, which contains pertinent user or device profile data, may be cross referenced as part of the login or access process. Alternatively, the login process may be performed through automated association of profile settings maintained as profile information 215 with an IP address, a carrier detection signal of a user device, mobile directory number (MDN), subscriber identity module (SIM) (e.g., of a SIM card), radio frequency identifier (RFID) tag or other identifier.

By way of example, the detection module 214 triggers the enrollment or authentication process in response to the user device 101 approaching the location of a resource. Under this scenario, the detection module 214 operates in connection with the communication interface 213 for transmitting as well as detecting wireless signals to and from a given resource. The signal may include identification information, which upon detection, alerts the registration module 201, enrollment module 203 or authentication module 209 of the availability and proximity of a resource. It is noted that the detection module 214 may also be configured to restrict the detecting of resources of which the user has no association, i.e., no resource policies 107c are associated with the user for that specific resource.

In certain embodiments, the enrollment module 203 facilitates an enrollment procedure. As noted, the enrollment procedure may be performed in conjunction with the registration process facilitated by the registration module 201. For enrollment purposes, the enrollment module 203 controls the various sensors 117 of the user device. In the case of a smartphone, for example, the enrollment module 201 generates a signal for accessing the front facing camera, microphone, or other integral sensors. Once complete, the enrollment module 203 relinquishes control of the various sensors 117. It is noted that any device having sensors for capturing biometric data related to the voice and facial expressions of the user are subject to control of the enrollment module 203—as initiated by the user or via a proximity condition being met. Also, it is noted that the enrollment module 203 facilitates execution of the various sensors in conjunction with an application 119 at the device. For instance, the application may be a dedicated application 119 for interfacing with a specific resource (e.g., a security gate application provided by the resource provider, an ATM access security application).

The enrollment module 203 facilitates the enrollment process via one or more resource policies 107c. According to one embodiment, enrollment module 203 is configured to "seed" the enrollment from previously captured, validated data pertaining to the user (e.g., voice recordings, videos, pictures of the user). As such, the module 203 can provide an initial baseline of biometric data without requiring direct user interaction. This "automated" baseline can then be improved upon by subsequent active or passive biometric data capture and analysis. The policies 107c correspond to a series of commands, questions and/or tasks to be fulfilled by the user for enabling the gathering of biometric data. As noted previously, multiple types of biometric data related to the user are gathered simultaneously, such as in a manner similar to a video chat session. Hence, the enrollment module 203 instructs the user to look into a camera sensor and speak into a microphone simultaneously as the user complies with or responds to a set of default instructions and protocols comprising the enrollment procedure. It is noted that the sensors may be used to detect the position and/or presence of a face within view of the camera (e.g., based on a standard facial template), the sound of a voice, etc.

FIG. 2B is a diagram of a flowchart depicting an enrollment process carried out by the biometric authenticator of FIG. 1, according to one embodiment. For the purpose of illustration, the enrollment module 203 executes processes 221-229. In a first step 221, the enrollment module 203 triggers activation of the sensors of the device for which enrollment is to be performed. In another step 223, the enrollment module 203 prompts the user to respond to an enrollment request, including responding verbally and physically to a number of enrollment questions, commands and/or tasks. Per step 225, the above procedures are repeated until satisfactory capture of the biometric data is achieved. Once achieved (captured), the biometric data is stored and enrollment is complete, corresponding to steps 227 and 229.

It is noted that the storing of biometric data during enrollment per step 227 may include linking the data to user profile information 215. In addition, enrollment completion per step 229 includes generation of a composite set of biometric data 107b for the user that includes both face and voice baseline data. The enrollment module 203 may employ various biometric analysis and generation techniques accordingly. In certain embodiments, the biometric data 107b may also be used for performing voice and facial data result extrapolation, wherein the composite set of data is sufficient to support deterministic analysis. Deterministic analysis includes any methods and procedures for employing baseline voice and facial expression data of the user to determine or estimate a voice or facial result. For example, video data featuring the user's face from a profile perspective may still be correlated with the front facing data gathered during the enrollment process. As another example, voice data provided by the user as input that does not directly correspond to voice data captured during enrollment may be extrapolated (e.g., baseline inflection, pitch, tone) for enabling sufficient recognition of the user.

In one embodiment, the recognition engine 205 employs various data recognition techniques for analyzing biometric data. This includes, for example, voice recognition, image and video recognition, iris recognition, vein recognition, motion analysis and the like. The recognition engine 205 also employs facial characteristic analysis. Any known and still developing protocols and algorithms may be employed. The recognition engine 205 processes the data in order to determine a correlation with known biometric data 107b pertaining to the user (e.g., as generated during enrollment). It is contemplated in certain embodiments that the aforementioned recognition approaches may be used in combination for interpreting the multiple different types of biometric data. It is further contemplated that the motion recognition techniques may be employed for determining user fulfillment of a predetermined motion or gesture (e.g., a secret facial expression or a specific sequence of facial features) or various user mannerisms.

In one embodiment, the context processing module 207 receives context information as gathered by the user device subject to the authentication procedure. Once received, the context processing module 207 analyzes the context information 107*a* provided by the context module 118. The data is processed according to the sensor type—i.e., if the sensor is a network detection sensor, it processes and interprets the network data (e.g., internet protocol address information). Likewise, if the sensor is a global positioning sensor, the module 207 interprets the gathered data as location and/or geo-spatial data. Of note, the context processing module 207 may operate in connection with the detection module 214 for responding to determined proximity conditions.

In one embodiment, the authentication module 209 enables the authentication process to be carried out for enabling user access, use, entry or allocation of a resource. Authentication is performed based on the data captured during the enrollment process by the enrollment module 203. The authentication module 209 prompts the user to respond to a one or more authentication questions, commands or tasks specific to authenticating the user. The response provided by the user, as biometric data, is then captured via one or more sensors 117 of the device 101*a*. The capture may include the compiling of audio and video data. It is noted that the authentication module 209 may also control the various sensors 117 of a given device during the authentication process. Also of note, the various instructions and protocols defining the procedure are processed by the authentication module 209 via one or more resource policies 107*c*.

It is noted that the authentication module 209 may be configured to perform online and/or offline processing of biometric data provided by a user for enabling biometric analysis. For example, in certain implementations, the authentication module 209 may perform baseline analysis of biometric data in conjunction with the recognition engine 205 at the device. Concurrent with this execution, more advanced or refined biometric analysis may be performed via a remote analytics service 230 that is accessible via the communication interface 213. Under this scenario, the analytics service 230 processes the response input (e.g., face and voice data) using various advanced algorithms then returns the processing result to the authentication module 209.

In one embodiment the user interface module 211 enables presentment of a graphical user interface for enabling user enrollment and authentication to be performed. By way of example, the user interface module 211 generates the interface in response to application programming interfaces (APIs) or other function calls corresponding to the browser application or web portal application of the user devices; thus enabling the display of graphics primitives. Of note, the user interface module 211 may operate in connection with the authentication module 209 and enrollment module 203 accordingly. The detection module 214 may also employ the user interface module 211 for alerting a user of the presence of a resource. It is noted that the user interface module may coincide with a browser application, dedicated application, or other interface based software operable at a user device subject to the authentication procedure.

In one embodiment, a communication interface 213 enables formation of a session over a network 109 between the biometric authenticator 103 and the resources. By way of example, the communication interface 213 executes various protocols and data sharing techniques for enabling collaborative execution between a subscriber's user device 101 (e.g., mobile devices, laptops, smartphones, tablet computers, desktop computers, servers, workstations) and the biometric authenticator 103 over the network 109. It is noted that the communication interface 213 is also configured to support a browser session—i.e., the retrieval of content as referenced by a resource identifier during a specific period of time or usage of the browser.

The above presented modules and components of the biometric authenticator 103 can be implemented in hardware, firmware, software, or a combination thereof. Furthermore, various of the modules may record log data 107*d* for supporting subsequent data analysis. Though depicted as a separate entity in FIG. 1, it is contemplated that the biometric authenticator 103 may be implemented for direct operation by respective user devices 101*a*-101*n*. As such, the biometric authenticator 103 may generate direct signal inputs by way of the operating system of the user device for interacting with the resources or the application 119. In another embodiment, one or more of the modules 201-214 may be implemented for operation by respective user devices as a platform, hosted solution, cloud based service, or the like. Under this scenario, a biometric authenticator-as-a-service access model may be employed, such as in connection with a mobile device module, a software development kit (SDK) and corresponding Service Provider Network processing scheme. As such, various application developers may incorporate multi-factor biometric authentication seamlessly within their applications and/or processing schemes. It is noted that the various modules may be used selectively or in combination within the context of a resource allocation or access scheme.

Figure 3A:
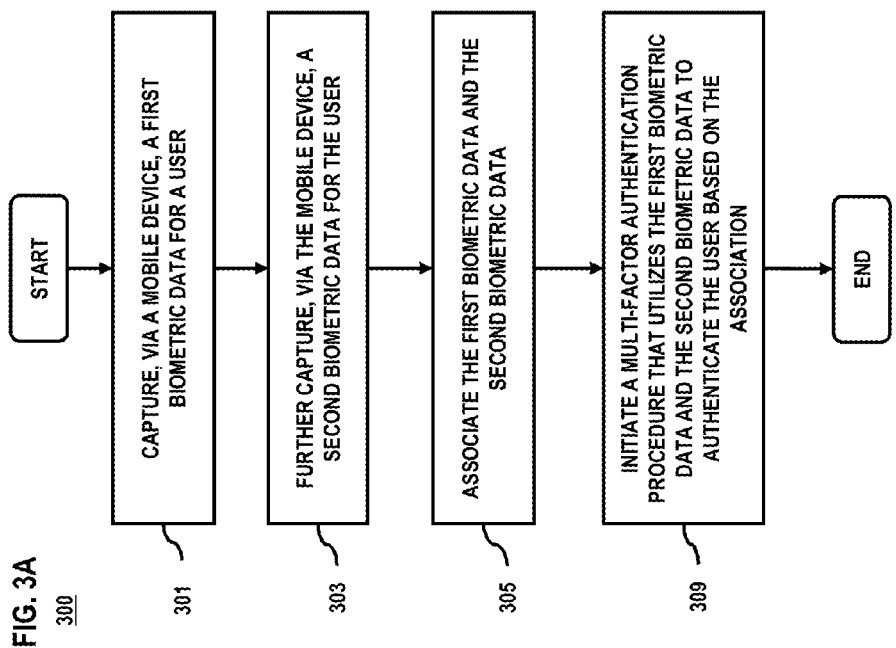
Figure 6:
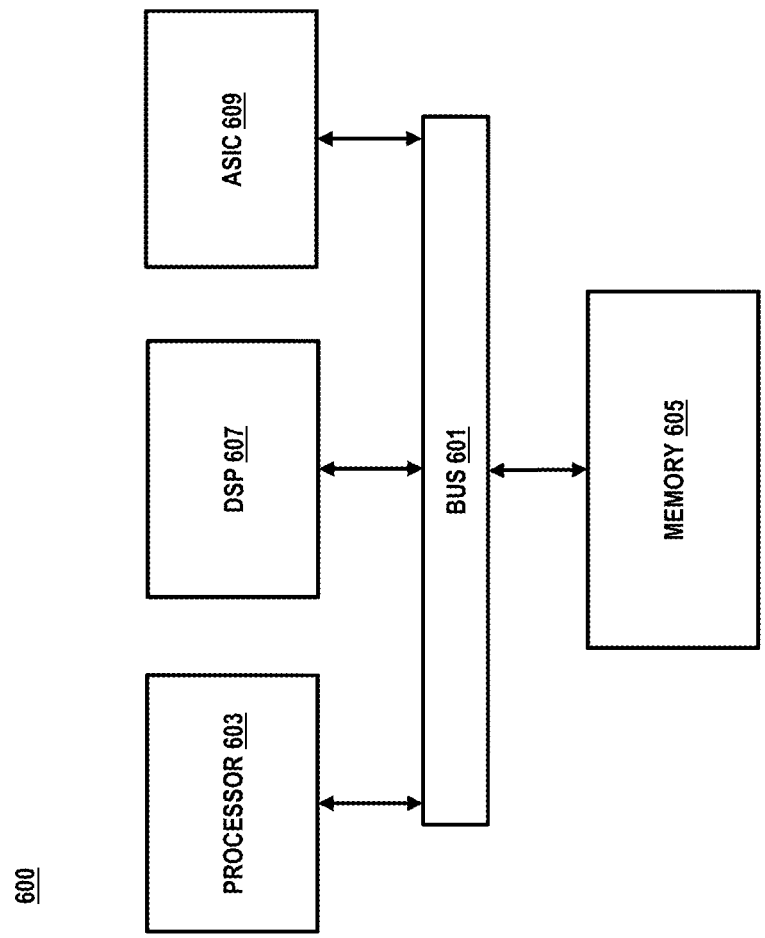
FIG. 6 is a diagram of a chip set that can be used to implement an embodiment of the invention.

FIGS. 3A and 3B are flowcharts of processes for enabling multi-factor biometric authentication of a user of a mobile device, according to various embodiments. In one embodiment, the biometric authenticator 103 performs processes 300 and 312 and is implemented in, for instance, a chip set including a processor and a memory as shown in FIG. 6. For the purpose of illustration, the processes are described with respect to FIG. 1. It is noted that the steps of the process may be performed in any suitable order, as well as combined or separated in any suitable manner. Furthermore, the biometric authenticator 103 may perform various of the processes in connection with the mobile device, a network service for enabling distributed processing, or a combination thereof.

In step 301 of process 300 (FIG. 3A), the biometric authenticator 103 captures, via the mobile device, a first biometric data for the user. The biometric authenticator 103 further captures, via the mobile device, a second biometric data for the user per step 303. By way of example, the first biometric data may include data pertaining to various facial expressions while the second may include iris, retinal, vein or voice data for the user. As noted previously, the first and second biometric data, as captured and recorded via one or more sensors, may be acquired concurrently as part of a multi-factor authentication procedure.

In steps 305 and 307, the biometric authenticator 103 associates the first and second biometric data and initiates a multi-factor authentication procedure that utilizes the first biometric data and the second biometric data to authenticate the user based on the association. As mentioned previously, the biometric authenticator 103 associates any voice data, video data, iris data, retinal data, vein data, fingerprint data, or the like as captured with the baseline biometric data pertaining to the user. The baseline biometric data includes that generated during the enrollment process or created from previously captured and validated user data. This pertains to the seeding scheme as previously described. Per step 309, the biometric authenticator 103 initiates a multi-factor authentication procedure that utilizes the first biometric data and the second biometric data to authenticate the user based on the association. As noted previously, the authentication may be part of a secured data access scheme, resource allocation scheme, or the like.

In step 313 of process 312 (FIG. 3B), the biometric authenticator 103 generates a message, at the mobile device, for requesting the user to respond to a command, a question, or a combination thereof. The first biometric data and the second biometric data are based on the response to the command and/or question. Responses may include, for example, a password, a user identifier, an answer to a challenge question, a phrase, a facial expression, a bodily feature, a sequence of movements of the mobile device, or a combination thereof. Per step 315, the biometric authenticator 103 determines a correlation between the first biometric data and the second biometric data based on voice recognition, facial recognition, fingerprint recognition, iris analysis, retinal analysis, vein analysis, or a combination thereof. As noted, the recognition and analysis may be performed at the mobile device, by a network service or cloud based solution, or in a distributed manner wherein processing is shared among the device and the service. It is noted, in the case of voice recognition, that "liveness" information can be calculated as a means of identifying recordings.

In step 317, the biometric authenticator 103 determines the rights of the user based on the association between the first and second biometric data for the user. The rights can correspond to a level of access, use, entry, or allocation of a resource associated with the multi-factor authentication procedure. The user may have a different set of rights associated with one resource versus another. Alternatively, the biometric authenticator 103 determines a user authentication confidence score that may be used to authorize a transaction, authorize access to resources, access to a facility, provided to another application or service for authorization determination, etc.

In step 319, the biometric authenticator 103 determines context information related to the mobile device. In certain embodiments, context information related to the user and/or resource to be accessed may also be determined. The context information may include, for example, location information, a mobile device identifier, a resource identifier, time information, network information, or a combination thereof. Per step 321, the biometric authenticator 103 determines whether the context information matches one or more criteria associated with the multi-factor authentication procedure. By way of example, location information as captured may be used determine if a proximity condition is met between the mobile device 101a and the resource.

Of note, the biometric authenticator 103 may also determines transmission of an authentication request by the mobile device and/or the resource. The authentication request is transmitted based on context information related to the mobile device, context information related to the resource, a user input at the mobile device, or a combination thereof. The context information relates to the use case where a location/proximity condition is fulfilled between the mobile device and the resource to trigger initiation of the authentication. In this case, presence detection triggers the authentication process. Additional context information, including locomotion (i.e., user movement, direction, speed), mobile device radio connectivity and signal strength, user's previous location (e.g., where they traveled from), etc., may also be leveraged in connection with the authentication. Alternatively, the user may invoke the authentication via a dedicated application 119 at the mobile device (e.g., an application designed specifically for a given resource). In an exemplary embodiment, biometric authenticator 103 can be provided as a service, e.g., with a mobile device module/SDK (software development kit) and corresponding service provider network-based processing. One advantage of this approach is that application developers can readily incorporate multi-factor biometric authentication seamlessly within their applications, thereby providing a good user experience.

FIGS. 4A-4E are diagrams of a user of a mobile device accessing a resource based on multi-factor biometric authentication, according to various embodiments. For the purpose of illustration, the diagrams are described with respect to an exemplary use case of a user initiating the enrollment process via their mobile device. In addition, a biometric authentication procedure is depicted as being performed based on the enrollment procedure. It is noted, however, that the enrollment and/or authentication procedures of the biometric authenticator 103 are capable of being initiated in response to fulfillment of a proximity condition (e.g., the user device is determined to be within range of a resource) or other contextual condition.

Figure 4A:
FIGS. 4A-4E are diagrams of a user of a mobile device enrolling with the biometric authenticator of FIG. 1, according to various embodiments.
Figure 4B:
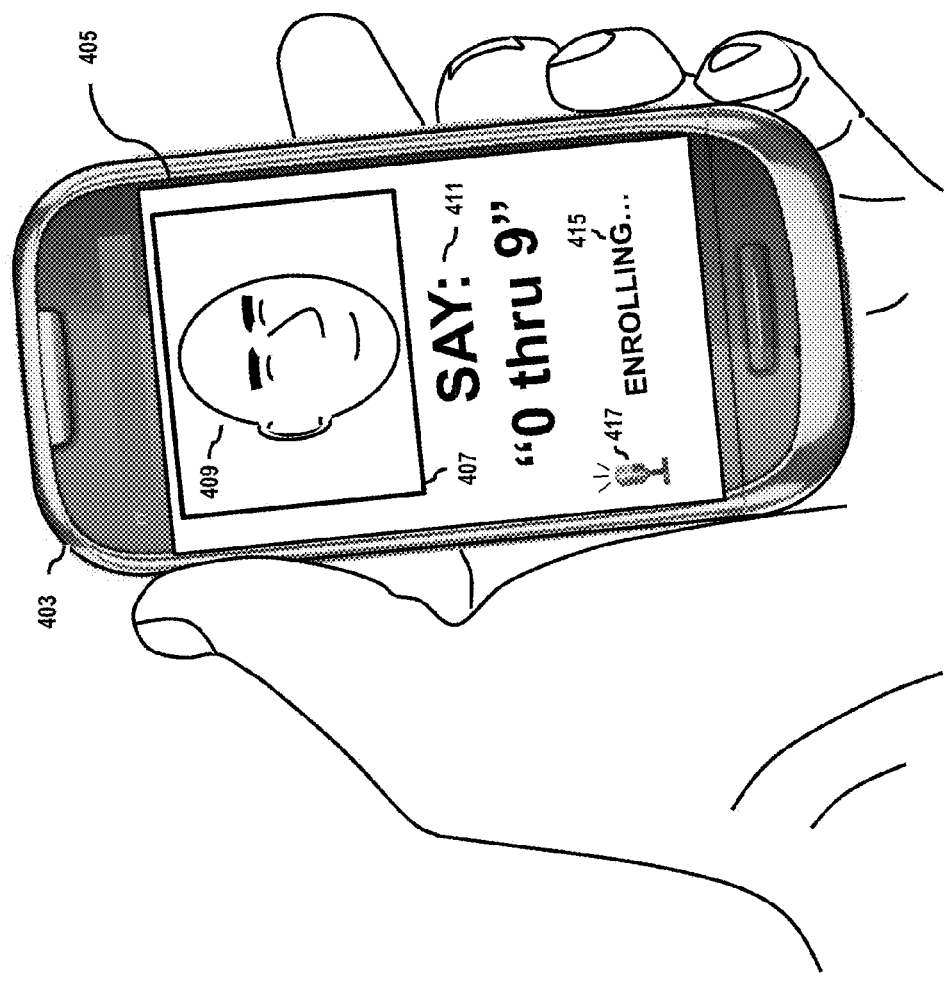

In FIGS. 4A and 4B, the user 401 initiates the enrollment process by way of an application at their mobile device 403. The application may execute instructions for enabling it to interface with the biometric authenticator 103 via a network, wireless link, or through direct device control means. Also, the application may be a browser (e.g., Hyper Text Mark-up Language (HTML) 5) or web portal tool capable of interfacing with the biometric authenticator 103 via a communication network. Under this scenario, the biometric authenticator 103 initiates the gathering of a first set of biometric data. As such, the application is caused to render various commands, questions and/or task requests to a user interface 405 of the device 403 for execution of the enrollment process. In certain embodiments, it is contemplated that the application causes rendering of the various commands, questions and/or task requests at the time of device activation (e.g., when the phone is switched on).

In FIG. 4A, an instruction is rendered to the user interface 405 for requesting the user to face into a camera of the device 403 such that an image of their face is shown within a designated viewing area 407. Alternatively, the biometric authentication request may be automatically initiated, such as in response to the opening or activating of the mobile device. Under this scenario, no instruction need be rendered to the user interface 405. In response to the authentication request, the user may adjust the orientation and/or position of the mobile device for complying with this request, i.e., to adjust the depth of the camera lens accordingly. One or more algorithms may be employed by the biometric authenticator 103 for detecting that a face 409 is within view.

Figure 4C:
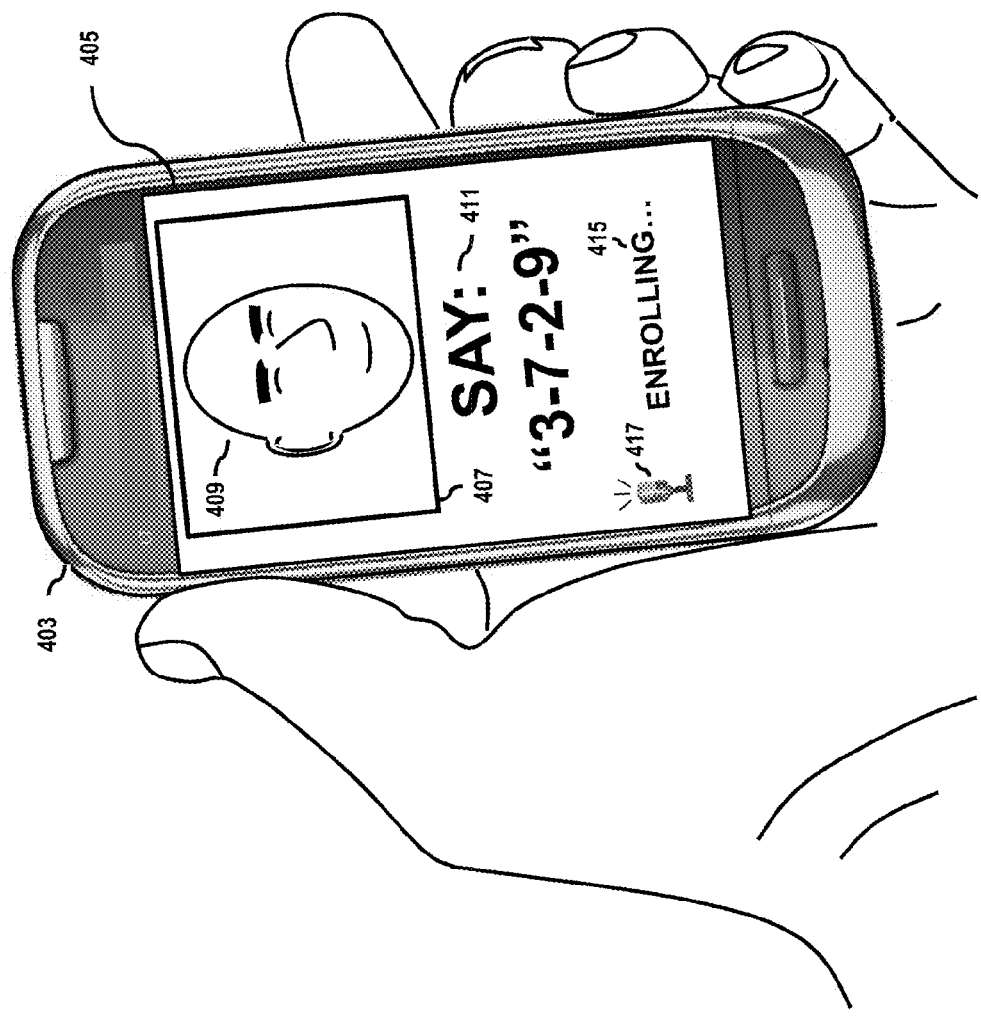
Figure 4D:
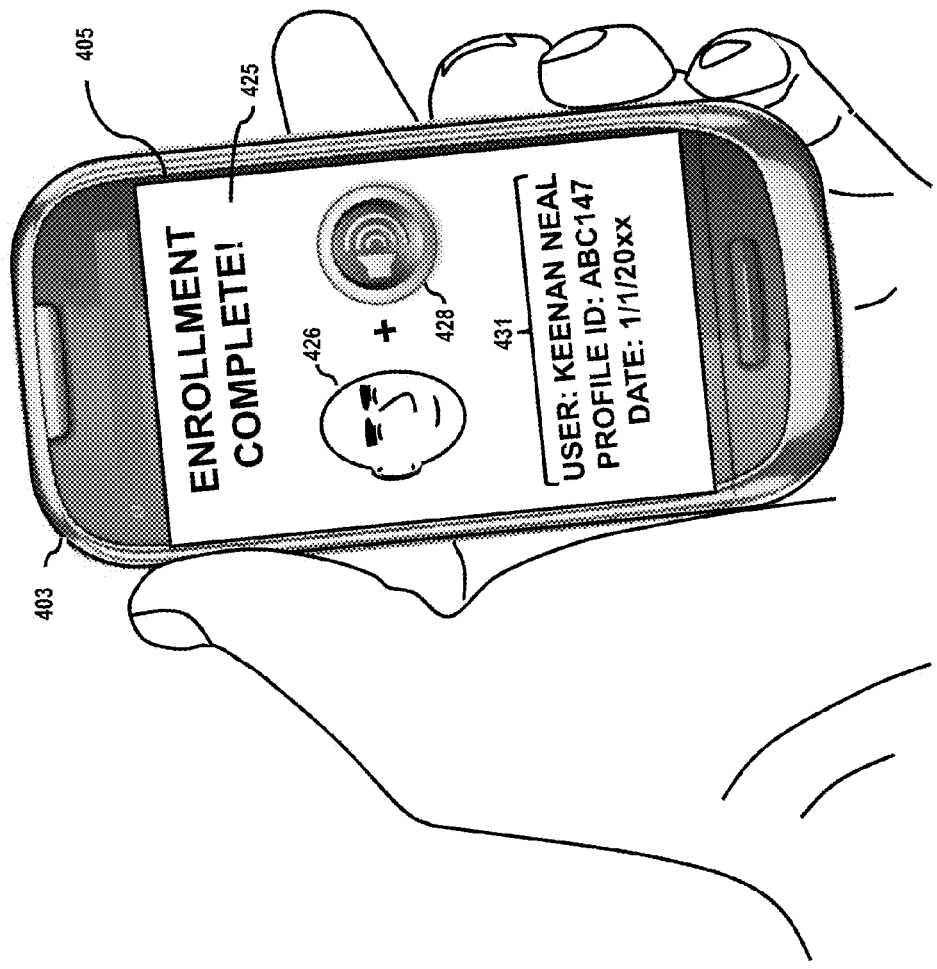

In addition to facing the camera, the user 401 is also presented with an instruction 411 to recite all the digits ranging from 0 to 9, as shown in FIG. 4B. Alternatively, as an additional enrollment requirement, the instruction may be for the user to recite various random digits, as shown in FIG. 4C. The user recites the digits while simultaneously facing the camera of the device 403. In FIG. 4A, the recitation is depicted as transmission of an audio signal 413/sound from the user's mouth. As a result, biometric data is captured accordingly, and the user interface renders a status message 415 for indicating enrollment is underway. A microphone icon 417 is also presented to the user interface 405 for indicating an audio signal 413 is currently being detected and recorded per the enrollment procedure. Alternatively, the icon 417 may be a video camera icon for indicating video footage of the user is being captured per the enrollment process. While not shown, additional instructions and/or commands relative to the authentication procedure may be presented to the user interface accordingly, including those instructions pertaining to the capture of retinal, iris or vein characteristics.

Once the user responds to all of the questions and the biometric data is recorded, an enrollment completion message 425 is rendered to the user interface 405. In addition to specifying completion of the enrollment process, the message 425 includes a graphic 426 depicting the user's face as well as an icon 428 depicting an audio signal. The graphic and icon 426 and 428 respectively are representative of the multiple different types of biometric data captured via enrollment—i.e., for use in generating a baseline biometric profile of the user. In certain embodiments, user profile information 431 regarding the user is also presented for specifying the user to which the biometric data correlates.

Figure 4E:
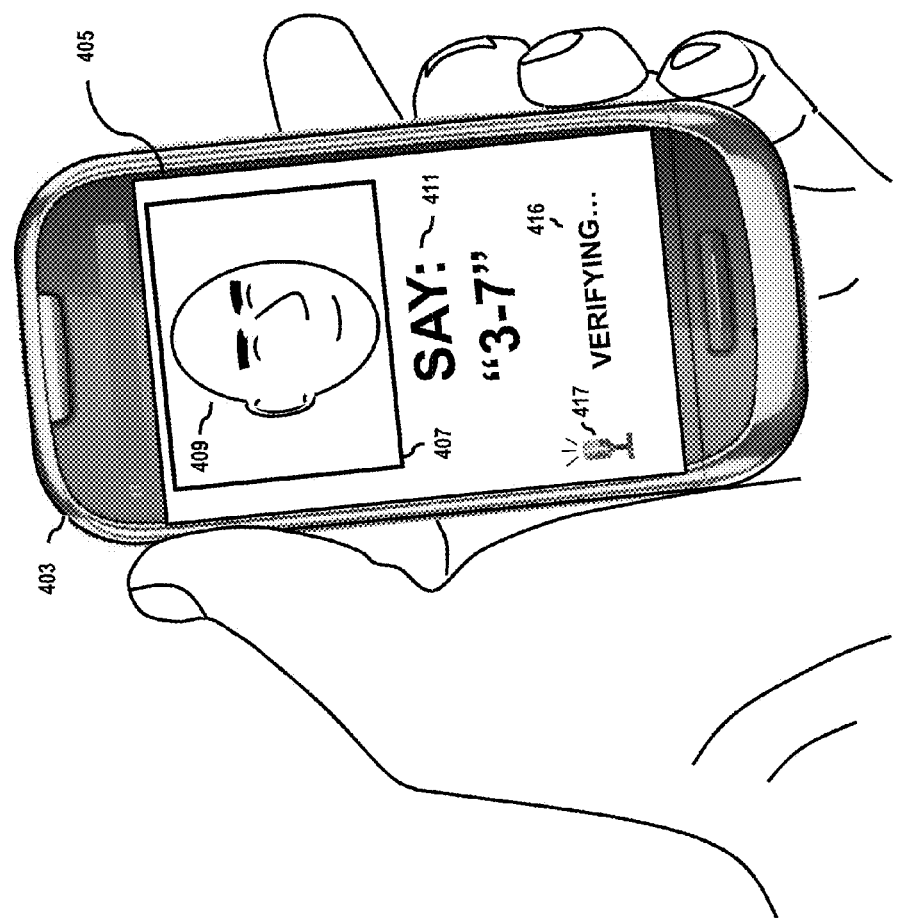

In FIG. 4E, an instruction is presented to the user for performing a biometric authentication. By way of example, the user is presented with an instruction and/or command (challenge) 411 to speak a two-digit phrase while facing the camera of the mobile device 403. A status message 416 for indicating the verification process is underway as the user speaks is presented to the display 405. It is noted that the verification procedure may be performed in connection with the enrollment process as an additional means of verifying the enrollment. In this way, subsequent attempts at biometric authentication for the user in connection with a resource may be adequately performed.

FIGS. 4F-4I are diagrams of a user of a mobile device accessing a resource based on multi-factor biometric authentication, according to various embodiments. For the purpose of illustration, the diagrams are described with respect to an exemplary use case of a user attempting to gain entry into a secured data center. An entrance to the data center includes a security gate 429 that is controlled by a controller module 432. The controller module 432 is housed within an unmanned security booth 437. For the purpose of illustration, the user 401 is granted access to the data center subject to multi-factor biometric authentication.

Figure 4F:
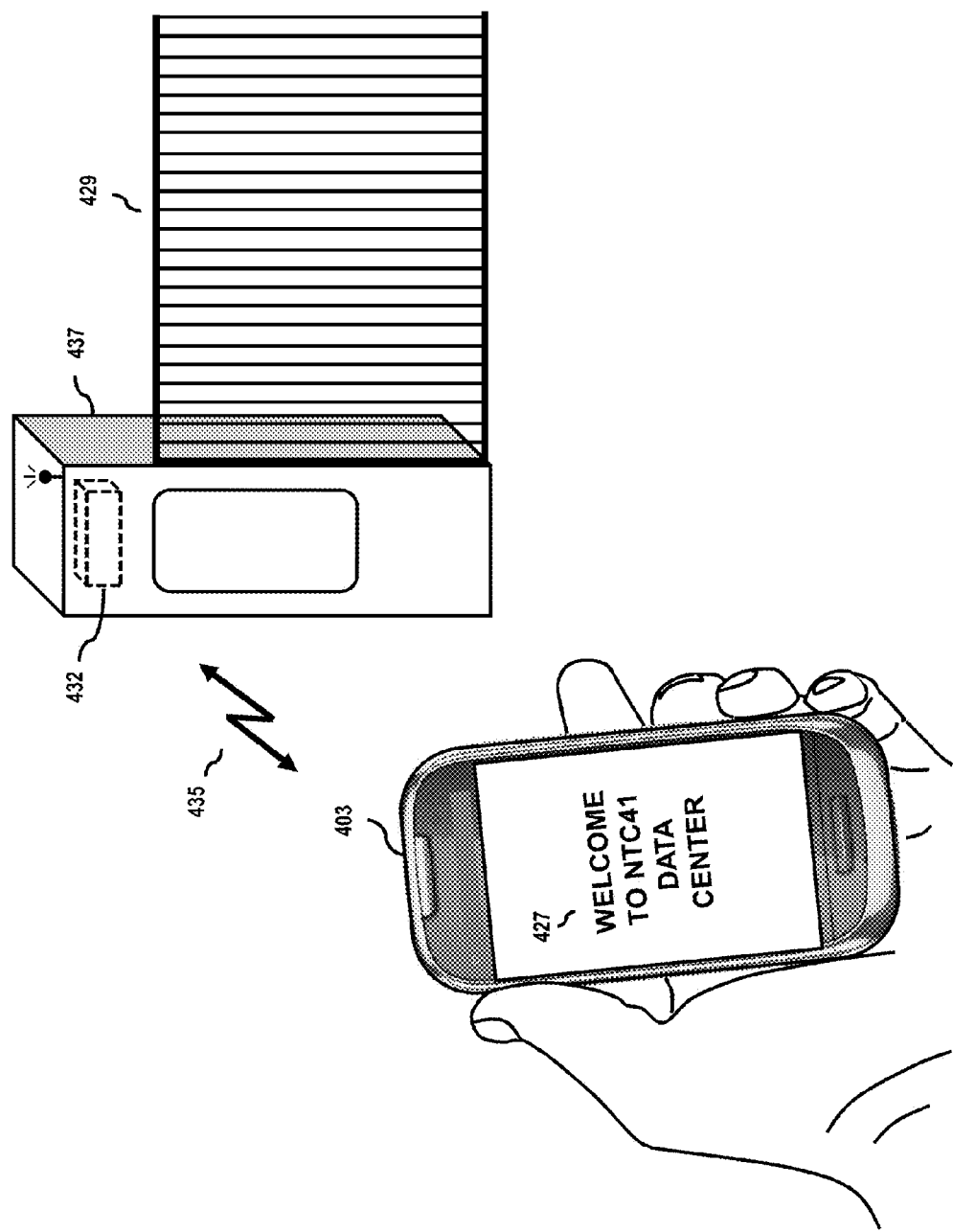

In FIG. 4F, as the user approaches the security gate 429, the controller 432 transmits a notification signal 435 for indicating the specific resource (e.g., the data center) is within proximity of the device 403. It is noted that the notification signal 435 may convey an identifier or other credentials, which are cross-referenced by the biometric authenticator 103 for determining user association with the resource. This may include, for example, retrieving various resource policies established by the provider of the data center; the policies including details regarding the user's access rights (or level thereof) with respect to the data center, authentication procedure to be performed, etc. In this scenario, once the signal is processed, a welcome message 427 is rendered to the display of the mobile device 403. Alternatively, the welcome message 427 may be rendered as an audio message, such as via the device 403 speakers.

Figure 4G:
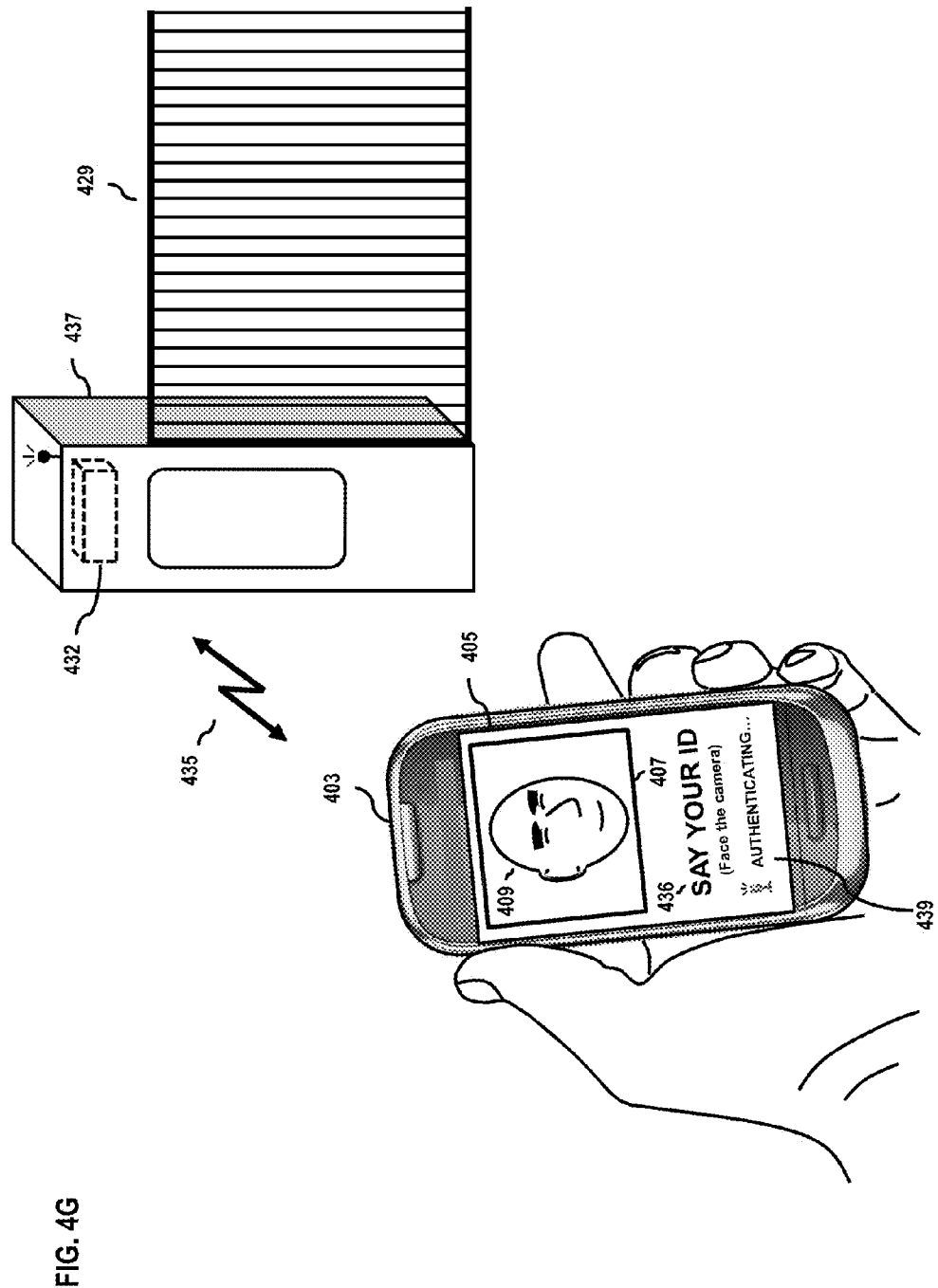

In FIG. 4G, the authentication procedure continues with the biometric authenticator rendering a security and/or authentication command to the user interface 405. The command 436 is a request for the user to utter their identifier (e.g., employee identifier, guest identifier, security identifier) for capture by a microphone of the mobile device 403. The authentication procedure also calls for the user to face into the camera of the mobile device 403, such that their face 409 is shown within a viewing area 407. Alternatively, the user may face into the camera associated with the resource they are attempting to access, such as the camera of an automated teller machine or at a security gate. Once the user begins speaking, the biometric authenticator 103 captures the biometric data as response input.

As noted previously, the command presented to the user interface 405 in FIG. 4G could also be rendered in audio form. For example, the biometric authenticator 103 may generate a voice command of the request for the user to utter their identifier. Under this scenario, the command 436 as rendered to the user interface 405 need not be shown. The user would respond to the voice command while facing the camera of the device 403, then enabling capture of biometric data for comparison against other biometric data for the user.

Once a response input in the form of voice and face data is provided, the biometric authenticator 103 analyzes the input using various data recognition techniques and algorithms for determining a correlation between the biometric data as captured during authentication against the biometric data compiled during enrollment or user biometric baseline data created from user data (e.g., in relation to the seeded biometric baseline data). During this time, a status message 439 is rendered to the user interface 405 for indicating the authentication process is underway. As noted, the recognition schemes may include voice, facial and motion recognition.

In addition to capturing biometric data related to the user's voice and face as the user recites the identifier, the authentication procedure further requires the user to perform one or more authentication gestures or motions. Under this scenario, as shown in FIG. 4H, the user is required to recite their identifier while adapting the distance D between the camera and the user's face or adjusting the position or motion 441/443 of the camera. As such, the area of focus of the camera upon the face of the user 401 is adapted. Consequently, the recorded video data includes face, voice and motion data, of which the face and voice data is correlated with the biometric data while the motion is correlated with a predetermined secret motion. Alternatively, the user 401 may adapt the position of the device 403, including focusing it on a specific portion of the face in a predetermined sequence (e.g., left eye-nose-right-eye-mouth-right ear). Any combination of approaches may be applied in connection with the authentication procedure.

Figure 4I:
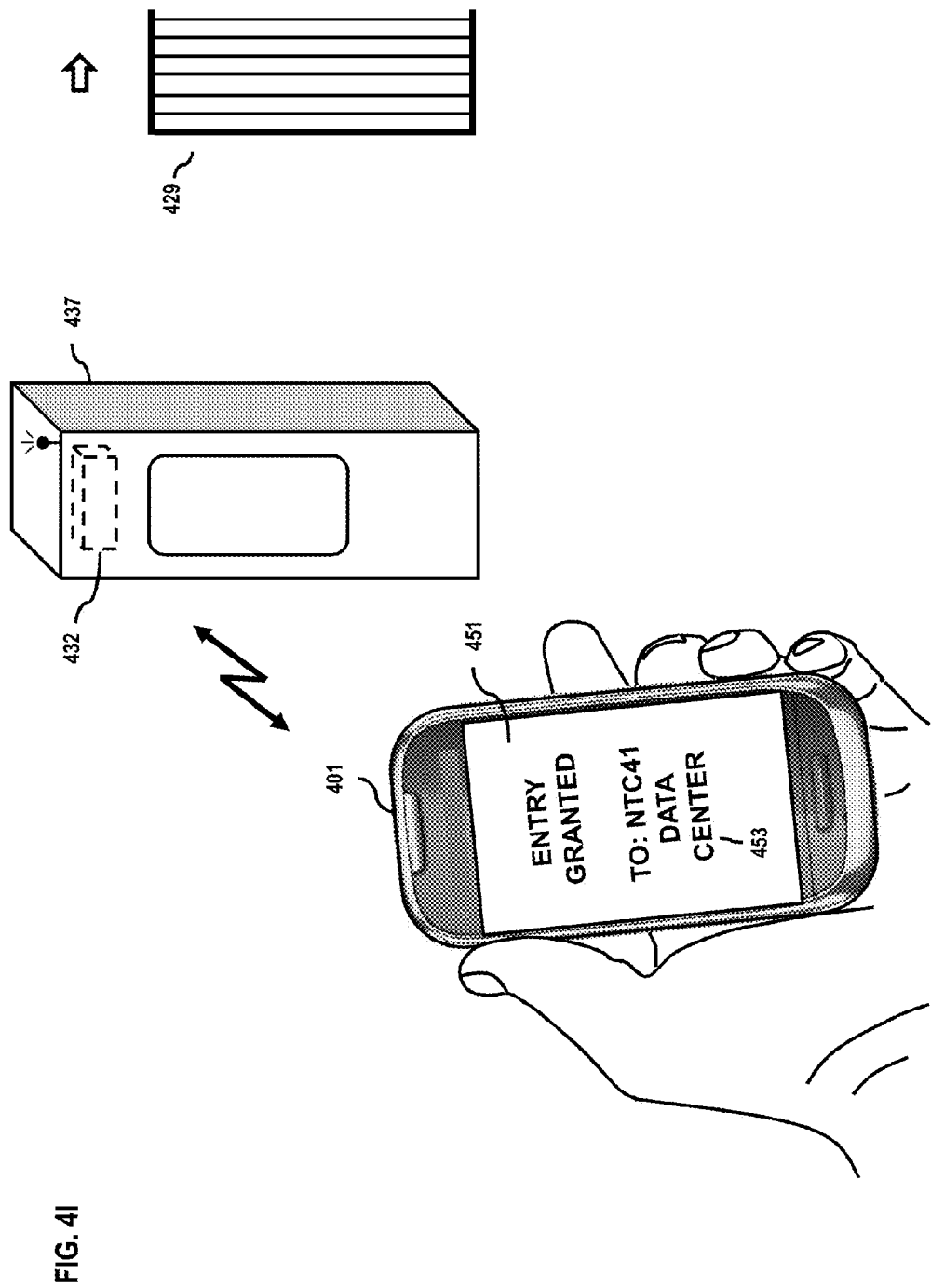

Once the correlation is determined, the authentication procedure is deemed complete. Under this scenario, an authentication completion message 451 is presented to the user interface 405, as shown in FIG. 4I. A portion 453 of the message 451 includes an indication of the specific resource to which the user is being granted access. In response to the authentication, the security gate 429 is opened for permitting entry by the user.

It is noted that the authentication completion message 451 may vary depending on the type of scheme for which the authentication is associated, the resource type, and the rights afforded the user. By way of example, in the case of the resource being an application, the completion message may indicate "Usage Granted" or "Limited Usage Granted" for corresponding with predetermined usage rights afforded the user. As another example, in the case of the resource being a network server, the completion message may indicate "Access Granted" or "Guest Access Only" for corresponding with predetermined access rights afforded the user. As yet another example, in the case of an ATM transaction, the completion message may indicate "Transaction Authorized up to $100" or "Transaction Authorized up to $10,000." Of note, the rights or score afforded the user may also be executed on a conditional basis, thus requiring the processing of context information and/or additional biometric processing (e.g., performed via the service provider network 109).

The exemplary techniques and systems presented herein enable multi-factor biometric authentication of a user of a mobile device. One advantage of the exemplary techniques and systems presented herein is the ability of the biometric authenticator 103 to enroll both face and voice biometric data during a brief enrollment process (e.g., similar to a video chat session). The result is in increased facial recognition accuracy as the nuances of the user's face, iris, retina, veins, speech patterns, gestures, etc., are accounted for. As another advantage, the biometric authenticator 103 may also employ the use of context information (e.g., location data) for enabling authentication. Still further, the biometric authenticator 103 enables the generation of random or knowledge based authentication questions and/or commands for use in multi-factor biometric authentication.

According to certain embodiments, the above processes and arrangements advantageously permit enhanced security using a multi-factor biometric authentication procedure that, for example, can be implemented utilizing minimal resources, and thus, can be suitable for mobile devices.

The processes described herein for enabling multi-factor biometric authentication of a user of a mobile device may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
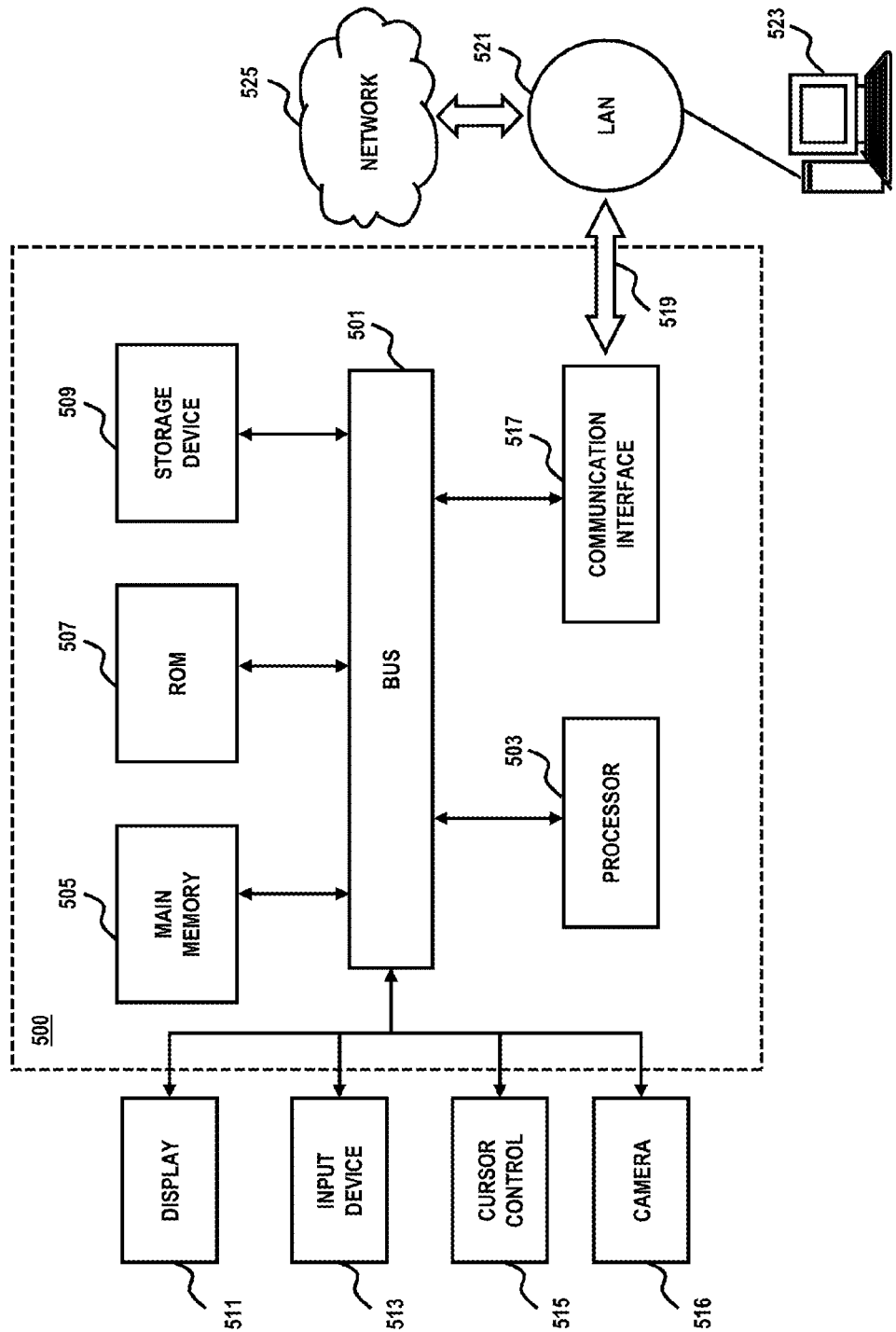
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511. Alternatively or additionally, an infrared light source (e.g., for performing retina biometric) and/or using display 511 as light source can be utilized to illuminate the user for capturing recognition data via camera 516.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media.

Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to enable multi-factor biometric authentication of a user of a mobile device as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of enabling multi-factor biometric authentication of a user of a mobile device.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to enable multi-factor biometric authentication of a user of a mobile device. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   initiating a multi-factor enrollment procedure that includes prompting a user to respond verbally and physically to an enrollment request;
   capturing, via a mobile device, a first biometric data for a user,
   wherein the mobile device includes a camera and microphone;
   further capturing, via the mobile device, a second biometric data for the user while capturing the first biometric data for the user,
   wherein capturing the second biometric data for the user while capturing the first biometric data for the user is carried out a plurality of times, each of the plurality of times be carried out in a different lighting environment, and
   wherein at least one of the capturing the first biometric data and the capturing of the second biometric includes a prompt to the user to alter an angle of the camera as the user recites a specific phrase into the microphone;
   associating the first biometric data and the second biometric data carried out the plurality of times to provide a correlation between the first biometric data and the second biometric data carried out the plurality of times; and
   initiating a multi-factor authentication procedure that utilizes the first biometric data and the second biometric data to authenticate the user based on the associating,
   wherein the prompting of the user to respond includes prompting the user to perform one or more conditional enrollment scenarios for concurrent capturing of voice data and facial characteristics, the one or more condition enrollment scenarios include requiring the user to adjust or modify various facial adornments or characteristics for compilation of different biometric profile data.

2. A method of claim 1, further comprising:

generating a request for the user to respond to a command, a question, or a combination thereof, wherein the concurrent capturing of the voice data and facial characteristics includes capturing various facial gestures, mannerisms, and expressions in association with data for indicating user voice inflection, intonation, sound, rhythmic and patterns, and wherein the first biometric data and the second biometric data are based on the response.

3. A method of claim 2, wherein the first biometric data and the second biometric data includes the voice and face data.

4. A method of claim 2, wherein the response is a password, a user identifier, an answer to a challenge question, a phrase, a facial expression, a bodily feature, a sequence of movements of the mobile device, a sequence of movements by the user, or a combination thereof.

5. A method of claim 1, further comprising:

comparing first biometric data and second biometric data obtained during the multi-factor authentication procedure with the first biometric data and the second biometric data from the multi-factor enrollment procedure to determine a match;

determining the match to be found when the comparing results in the match being within a predetermined threshold;

determining a user profile based on the match found to be within the predetermined threshold, wherein the correlation is based on voice recognition, facial recognition, fingerprint recognition, iris analysis, retinal analysis, vein analysis, or a combination thereof, and wherein the first biometric data and the second biometric data are acquired concurrently as part of the multi-factor authentication procedure.

6. A method of claim 5, wherein the voice recognition, the facial recognition, the fingerprint recognition, the iris analysis, the retinal analysis, the vein analysis, or a combination thereof is performed by the mobile device, a network service, or a combination thereof.

7. A method of claim 1, further comprising:

comparing first biometric data and second biometric data obtained during the multi-factor authentication procedure with the first biometric data and the second biometric data from the multi-factor enrollment procedure to determine a match;

determining an authentication confidence score once a match is determined; and determining a plurality of rights of the user based on the association, wherein the enrollment procedure is performed to facilitate the capturing of the first biometric data and the second biometric data, the plurality of rights correspond to a level of access, use, entry, or allocation of a resource associated with the multi-factor authentication procedure, wherein at least one of the plurality of rights requires a first authentication confidence score and at least one other of the plurality of rights requires a second authentication confidence score that is higher than the first authentication confidence score, and wherein the prompting of the user is based on a determination that a greater level of authentication is required.

8. A method of claim 7, wherein the resource is another mobile device, a wireless node, a security system, a service, or a combination thereof, and wherein the multi-factor enrollment procedure is initiated in response to a determination that the mobile device is within range of the resource.

9. A method of claim 1, further comprising:

determining context information related to the mobile device; and determining whether the context information matches one or more criteria associated with the multi-factor authentication procedure, wherein the enrollment procedure is initiated in response to a fulfillment of a proximity condition.

10. A method of claim 9, wherein the context information includes location information, a mobile device identifier, a resource identifier, time information, network information, motion information, log data, or a combination thereof.

11. An apparatus comprising:

at least one processor; and at least one memory including computer program code for one or more programs, the at least one memory and the computer program code configured to, with the at least one processor, cause the apparatus to perform at least the following, initiating a multi-factor enrollment procedure that includes prompting a user to respond verbally and physically to an enrollment request;

capturing, via a mobile device, a first biometric data for a user, wherein the mobile device includes a camera and microphone;

further capturing, via the mobile device, a second biometric data for the user while capturing the first biometric data for the user, wherein capturing the second biometric data for the user while capturing the first biometric data for the user is carried out a plurality of times, each of the plurality of times be carried out in a different lighting environment, and wherein at least one of the capturing the first biometric data and the capturing of the second biometric includes a prompt to the user to alter an angle of the camera as the user recites a specific phrase into the microphone;

associating the first biometric data and the second biometric data carried out the plurality of times to provide a correlation between the first biometric data and the second biometric data carried out the plurality of times; and initiating a multi-factor authentication procedure that utilizes the first biometric data and the second biometric data to authenticate the user based on the association, wherein the prompting of the user to respond includes prompting the user to perform one or more conditional enrollment scenarios for concurrent capturing of voice data and facial characteristics, the one or more condition enrollment scenarios include requiring the user to adjust or modify various facial adornments or characteristics for compilation of different biometric profile data.

12. An apparatus of claim 11, wherein the apparatus is further caused to perform:

generating a message, at the mobile device, for requesting the user to respond to a command, a question, or a combination thereof, wherein the concurrent capturing of the voice data and facial characteristics includes capturing various facial gestures, mannerisms, and expressions in association with data for indicating user voice inflection, intonation, sound, rhythmic and patterns, and wherein the first biometric data and the second biometric data are based on the response.

13. An apparatus of claim 12, wherein the first biometric data and the second biometric data includes voice data and face data.

14. An apparatus of claim 12, wherein the response is a password, a user identifier, an answer to a challenge question, a phrase, a facial expression, a bodily feature, a sequence of movements of the mobile device, or a combination thereof.

15. An apparatus of claim 11, wherein the apparatus is further caused to perform:
comparing first biometric data and second biometric data obtained during the multi-factor authentication procedure with the first biometric data and the second biometric data from the multi-factor enrollment procedure to determine a match;
determining the match to be found when the comparing results in the match being within a predetermined threshold;
determining a user profile based on the match found to be within the predetermined threshold,
wherein the correlation is based on voice recognition, facial recognition, fingerprint recognition, iris analysis, retinal analysis, vein analysis, or a combination thereof, and
wherein the first biometric data and the second biometric data are acquired concurrently as part of the multi-factor authentication procedure.

16. An apparatus of claim 15, wherein the voice recognition, the facial recognition, the fingerprint recognition, the iris analysis, the retinal analysis, the vein analysis, or a combination thereof is performed by the mobile device, a network service, or a combination thereof.

17. An apparatus of claim 11, wherein the apparatus is further caused to perform:
comparing first biometric data and second biometric data obtained during the multi-factor authentication procedure with the first biometric data and the second biometric data from the multi-factor enrollment procedure to determine a match;
determining an authentication confidence score once a match is determined; and
determining a plurality of rights of the user based on the association,
wherein the first biometric data and the second biometric data are associated with baseline biometric data, the baseline biometric data includes a subset of biometric data collected in response to the enrollment request,
wherein at least one of the plurality of rights requires a first authentication confidence score and at least one other of the plurality of rights requires a second authentication confidence score that is higher than the first authentication confidence score, and
wherein the plurality of rights correspond to a level of access, use, entry, or allocation of a resource associated with the multi-factor authentication procedure.

18. An apparatus of claim 17, wherein the resource is another mobile device, a wireless node, a security system, a service, or a combination thereof.

19. An apparatus of claim 11, wherein the apparatus is further caused to perform:
determining context information related to the mobile device; and
determining whether the context information matches one or more criteria associated with the multi-factor authentication procedure.

20. An apparatus of claim 19, wherein the context information includes location information, a mobile device identifier, a resource identifier, time information, network information, or a combination thereof.

* * * * *